(12) United States Patent (10) Patent No.: US 8,411,770 B2
Hamaguchi et al. (45) Date of Patent: Apr. 2, 2013

(54) BASE STATION DEVICE, MOBILE TERMINAL DEVICE, WIRELESS COMMUNICATION SYSTEM, AND WIRELESS COMMUNICATION METHOD

(75) Inventors: Yasuhiro Hamaguchi, Osaka (JP); Hideo Namba, Osaka (JP); Shimpei To, Osaka (JP); Kazunari Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 427 days.

(21) Appl. No.: 12/744,639

(22) PCT Filed: Nov. 26, 2008

(86) PCT No.: PCT/JP2008/071401
§ 371 (c)(1),
(2), (4) Date: May 25, 2010

(87) PCT Pub. No.: WO2009/069630
PCT Pub. Date: Jun. 4, 2009

(65) Prior Publication Data
US 2010/0254484 A1 Oct. 7, 2010

(30) Foreign Application Priority Data
Nov. 26, 2007 (JP) .................................. 2007-304321

(51) Int. Cl.
*H04K 1/10* (2006.01)
(52) U.S. Cl. ........ 375/260; 375/262; 375/265; 375/267; 375/340; 375/343; 375/346; 375/347
(58) Field of Classification Search .................. 375/260, 375/295, 262, 267, 316, 340, 343, 346, 347; 370/203, 204, 205, 208, 209, 210
See application file for complete search history.

(56) References Cited

U.S. PATENT DOCUMENTS
8,102,927 B2 * 1/2012 Kim et al. ..................... 375/260
(Continued)

FOREIGN PATENT DOCUMENTS
JP 11-55206 A 2/1999
JP 2003-283460 A 10/2003
(Continued)

OTHER PUBLICATIONS
3GPP TSG RAN WG1 #42 on LTE, NTT DoCoMo, NEC, Sharp, "DFT-Spread OFDM with Pulse Shaping Filter in Frequency Domain in Evolved UTRA Uplink", R1-050702, Aug. 29-Sep. 2, 2005, pp. 1-8.
(Continued)

*Primary Examiner* — Dhaval Patel
(74) *Attorney, Agent, or Firm* — Birch, Stewart, Kolasch & Birch, LLP

(57) ABSTRACT

A wireless transmission device converts signals having been subjected to a first modulation into frequency domain signals, and allocates the frequency domain signals converted to subcarriers for transmission. The wireless transmission device includes: a controller that selects, based on channel qualities of the subcarriers to which the frequency domain signals are allocated, a value satisfying a predetermined communication quality as control information indicative of the number of frequency domain signals included in each of segments into which the frequency domain signals are segmentalized; and an allocating unit that segmentalizes the frequency domain signals into segments, each of the segments including the same number of frequency domain signals as the value selected as the control information by the controller, and allocates the frequency domain signals included in each of the segments to sequential subcarriers.

13 Claims, 9 Drawing Sheets

U.S. PATENT DOCUMENTS

| | | | |
|---|---|---|---|
| 2004/0233836 | A1 | 11/2004 | Samasu et al. |
| 2007/0104149 | A1* | 5/2007 | Khan et al. ............... 370/334 |
| 2010/0098177 | A1 | 4/2010 | Hamaguchi et al. |
| 2010/0183090 | A1* | 7/2010 | Abbasfar et al. ............ 375/296 |

FOREIGN PATENT DOCUMENTS

| | | |
|---|---|---|
| JP | 2004-104574 A | 4/2004 |
| WO | WO 2008/081876 A1 | 7/2008 |

OTHER PUBLICATIONS

3GPP TSG RAN WG1 Meeting #51, NTT DoCoMo, Fujitsu, Mitsubishi Electric, NEC, Panasonic, Sharp, Toshiba Corporation, "Necessity of Multiple Bandwidths for Sounding Reference Signals", R1-074807, Nov. 5-9, 2007, pp. 1-10.

3GPP TSG RAN WG1 Meeting #51, Sharp, "Sub-band position encoding for Best-M based CQI reporting", R1-074659, Nov. 5-9, 2007, pp. 1-5.

Mashima et al., "Microscopic Spectrum Control Technique Using Carrier Interferometry for One-Cell Reuse Single Carrier TDMA Systems", The 17th Annual IEEE International Symposium on Personal, Indoor and Mobile Radio Communications (PIMRC'06).

3GPP TSG-RAN-WG1 #51, Ericsson, Nokia, Nokia Siemens Network, Texas Instruments, Huawei, AT&T, NTT DoCoMo, Fujitsu, LG, Sharp, Panasonic, Mitsubishi, Qualcomm, Motorola. Freescale Semiconductor Inc, Samsung, NEC, "Proposal for Refinements on Frequency-Selective CQI for Single Tx and TxD", R1-075064, Nov. 5-9, 2007.

* cited by examiner

ALLOCATE DATA TO SUCCESSIVE SUBCARRIERS.

ALLOCATE DATA TO SUBCARRIERS AT PREDETERMINED INTERVAL.

BASE STATION DEVICE, MOBILE TERMINAL DEVICE, WIRELESS COMMUNICATION SYSTEM, AND WIRELESS COMMUNICATION METHOD

TECHNICAL FIELD

The present invention relates to a base station device, a mobile terminal device, a wireless communication system, and a wireless communication method. Particularly, the present invention relates to a base station device, a mobile terminal device, a wireless communication system, and a wireless communication method, using spectrum control single carrier communication in which one or more frequency domain signals can be allocated to multiple sub carriers.

Priority is claimed on Japanese Patent Application No. 2007-304321, filed Nov. 26, 2007, the content of which is incorporated herein by reference.

BACKGROUND ART

Recently, next generation mobile communication systems have been extensively studied. As a method of enhancing the system frequency utilization efficiency, a single frequency reuse cellular system, in which each cell uses the same frequency band, has been proposed.

OFDMA (Orthogonal Frequency Division Multiple Access) is dominant in a downlink (communication from a base station device to a mobile terminal device). OFDMA is a communication system in which information data are modulated using modulation schemes, such as 64QAM (64-ary Quadrature Amplitude Modulation) or BPSK (Binary Phase Shift Keying), to generate OFDM signals, and resource blocks, each of which is an access unit defined by time-and-frequency axes, are shared by multiple mobile station devices. Since OFDM signals are used, a PAPR (Peak to Average Power Ratio) becomes very high in some cases. The high peak power is not a significant problem for downlink communication achieving a relatively-high transmission-power amplifying performance. However, the high peak power is a fatal problem for uplink communication (from the mobile station to the base station device) achieving a relatively-low transmission-power amplifying performance.

For this reason, single carrier communication schemes, in which a PAPR is relatively low, have been proposed. DFT-s-OFDM (Discrete Fourier Transform-spread-OFDM) is one of the single carrier communication schemes (see, for example, Non-Patent Document 1). FIG. 7 is a schematic block diagram illustrating a configuration of a transmission device using DFT-s-OFDM. An encoder 100 performs error correction coding on transmission data that is received information data. A modulator 101 performs modulation, such as BPSK (Binary Phase Shift Keying) (hereinafter, performing a modulation is called "first modulation" in this description). An S/P (Serial/Parallel) converter 102 converts time-domain signals into parallel signals. A DFT (Discrete Fourier Transform) unit 103 performs Fourier transform to convert the time domain signals into frequency domain signals.

The converted frequency domain signals are allocated to inputs of the IDFT (Inverse Discrete Fourier Transform) unit 105 through the subcarrier allocating unit 104 based on a rule as explained later. The IDFT unit 105 inserts 0 to IDFT points receiving no inputs, and performs IDFT to obtain a time domain waveform. A GI (Guard Interval) inserter 106 inserts a guard interval into the time domain waveform. A P/S (Parallel/Serial) converter 107 converts the time domain waveform into serial signals. A D/A (Digital/Analog) converter 108 converts the serial signals into analog signals. An RF (Radio Frequency) unit 109 upconverts the analog signals into radio frequency signals, and transmits the radio frequency signals through an antenna (not shown). For a system multiplying multiple data pieces of multiple users, the number of IDFT points is set to be greater than that of DFT points, and subcarriers to which 0 is inserted are used by other mobile terminal devices.

The data generated in this manner has a low PAPR similarly to the case of single carrier modulation. Additionally, the insertion of the guard interval enables the generated data to be processed without inter-symbol interference, similarly to OFDM signals (an interval at which a guard interval is inserted, i.e., data processing unit by which DFT is performed is called a "symbol" in this description). The frequency-domain waveform is generated by DFT, enabling easy control in the frequency domain.

Two methods have been proposed as the frequency allocation rule. One method is called "L (Localized) allocation," and the other method is called "D (Distributed) allocation." As shown in FIG. 8A, the L allocation is an allocation scheme in which frequency data pieces having been subjected to DFT are sequentially allocated to the inputs of the IDFT unit without changing the arrangement of the frequency data pieces. As shown in FIG. 8B, the D allocation is an allocation scheme in which the frequency data pieces are distanced at a predetermined interval and allocated to the inputs of the IDFT unit.

The L allocation can achieve the diversity effect obtained by each user selecting a suitable frequency band, i.e., the user diversity effect. The D allocation can achieve the frequency diversity effect since frequency bands are widely used. However, both allocation schemes cannot achieve selection of optimal subcarriers for communication. Sufficient performance cannot be achieved especially in a channel environment causing high frequency selectivity or in an environment affected by many interference signals from other cells.

As AMCS (Adaptive Modulation and Coding Scheme), it has been proposed that the first modulation scheme be changed based on a channel condition. This is a method in which a modulation scheme, an encoding rate, or the like is changed based on SNR (Signal to Noise Ratio) indicative of channel quality of a band to be used or SINR (Signal to Noise and Interference Ratio), and a target error rate.

On the other hand, as an uplink communication scheme, a single carrier CI (Carrier Interferometry) has been proposed (see, Non-Patent Document 2). Also in this scheme, transmission signals can be generated by the same signal generation scheme as DFT-s-OFDM. Non-Patent Document 2 has proposed flexible allocation rules with respect to the aforementioned allocation rules (L allocation and D allocation).

This is a scheme in which frequency domain signals output from the DFT unit are grouped into blocks (hereinafter, "segments") each including several subcarriers. Then, when those signals are allocated to the inputs of the IDFT unit, subcarriers less affected by other cells are selected, and the signals are allocated to the selected subcarriers (which is, hereinafter, defined as "LS-x allocation" where x is the number of frequency domain signals allocated to the same segment). This allocation can enable selection of subcarriers achieving higher communication precision, compared to the aforementioned L allocation. If only the optimal allocation is considered, the PAPR characteristics degrade. If the number of frequency domain signals included in each segment is increased, however, the degradation of the PAPR characteristics can be reduced. If the number of frequency domain signals included in each segment is 1, optimal subcarriers can be selected. In this case, a PAPR increases and approximates that of the OFDM signals allocated to the same number of subcarriers.

The following fact is known (see Non-Patent Document 2). As the number of frequency domain signals included in each segment increases, the PAPR decreases, i.e., the PAPR characteristics become better. The better PAPR characteristics indicate a low probability of a high instantaneous power. As the number of frequency domain signals included in each segment decreases, the error rate characteristics become better. Hereinafter, in this description, LS-xx denotes a scheme in which the number of frequency domain signals included in each segment is xx.

Additionally, it is known as an adaptive control that if the number of frequency domain signals to be used is set to be half or quarter the usual number (i.e., half rate or quarter rate), communication is continued even under interference influence without decreasing the throughput. The LS-xx allocation is used to decrease the rate. When the total number of subcarriers is 64, Non-Patent Document 2 recommends LS-8 based on the relationship between the PAPR and the error rate characteristics (see Non-Patent Document 2).

Hereinafter, a method in which single-carrier signals are generated by a method of generating multi-carrier signals, such as DFT-s-OFDM or CI, and then the generated spectra are controlled for communication, is collectively called a "spectrum control single carrier communication method" in this description

[Non-Patent Document 1] 3GPP R1-050702, "DFT-Spread OFDM with Pulse Shaping Filter in Frequency Domain in Evolved UTRA Uplink," NTT DoCoMo

[Non-Patent Document 2] The 17th Annual IEEE International Symposium on Personal, Indoor and Mobile Wireless communications (PIMRC' 06), "MICROSCOPIC SPECTRUM CONTROL TECHNIQUE USING CARRIER INTERFEROMETRY FOR ONE-CELL REUSE SINGLE CARRIER TDMA SYSTEMS," Osaka University

DISCLOSURE OF THE INVENTION

Problems to be Solved by the Invention

Although the excellent PAPR characteristics can be achieved when the conventional L allocation or D allocation is used, there is a low degree of freedom of selecting subcarriers to which frequency domain signals are allocated. For this reason, subcarriers achieving good channel conditions cannot be used, thereby causing a degradation of communication efficiency.

Although the excellent PAPR characteristics can be achieved when the conventional LS-8 allocation is used to decrease the number of frequency domain signals, there is a low degree of freedom of selecting subcarriers to which frequency domain signals are allocated. For this reason, subcarriers achieving good channel conditions cannot be used, thereby causing a degradation of communication efficiency. Although the channel qualities of subcarriers are excellent and the error rate is low, a sufficiently low PAPR cannot be obtained. For this reason, a waveform is distorted upon amplification, and interference waves affecting other cells occur, thereby causing a degradation of the communication efficiency of the entire system.

The problems to be solved are to provide a wireless communication system, a wireless transmission device, a wireless communication method, and a program, which can achieve excellent communication efficiency and PAPR characteristics.

Means for Solving the Problems

According to one aspect of the present invention, a base station device may include, but is not limited to a controller configured to select one of first and second methods to assign a plurality of subcarriers to a mobile terminal device. The first method is such that the plurality of subcarriers are grouped into at least two groups and that the at least two groups are arranged separately. The second method is such that the plurality of subcarriers are arranged continuously. The controller is configured to select, if the first method is selected, one of a plurality of modulation schemes to be used for the mobile terminal device to modulate transmission data.

According to another aspect of the present invention, a mobile terminal device may include, but is not limited to a controller configured to select one of first and second methods to arrange a plurality of subcarriers to be used for transmitting transmission data. The first method is such that the plurality of subcarriers are grouped into at least two groups and that the at least two groups are arranged separately. The second method is such that the plurality of subcarriers are arranged continuously. The controller is configured to select, if the first method is selected, one of a plurality of modulation schemes for modulating the transmission data.

According to another aspect of the present invention, a wireless communication system may include, but is not limited to: a base station device; and a mobile terminal device. The base station device may include, but is not limited to: a controller; and a transmitter. The controller is configured to select one of first and second methods to assign a plurality of subcarriers to a mobile terminal device. The first method is such that the plurality of subcarriers are grouped into at least two groups and that the at least two groups are arranged separately. The second method is such that the plurality of sub carriers are arranged continuously. The controller is configured to select, if the first method is selected, one of a plurality of modulation schemes to be used for the mobile terminal device to modulate transmission data. The transmitter is configured to transmit a first information related to the one of the first and second methods and a second information related to the one of the plurality of modulation schemes. The mobile terminal device may include, but is not limited to: a receiver; and an allocating unit. The receiver is configured to receive, from the base station device, the first information and the second information. The allocating unit is configured to allocate the plurality of subcarriers based on the first information.

According to another aspect of the present invention, a wireless communication method may include, but is not limited to the following processes. One of first and second methods is selected to arrange a plurality of subcarriers to be used for transmitting transmission data. The first method is such that the plurality of subcarriers are grouped into at least two groups and that the at least two groups are arranged separately. The second method is such that the plurality of subcarriers are arranged continuously. If the first method is selected, one of a plurality of modulation schemes for modulating the transmission data is selected.

Effects of the Invention

According to the wireless communication system, the wireless transmission device, the wireless communication method, and the program of the present invention, the number of frequency domain signals included in each segment is set to a value satisfying a predetermined communication quality, based on channel conditions of subcarriers to which the frequency domain signals are allocated. For this reason, predetermined communication quality and excellent communication efficiency can be achieved. Further, excellent PAPR characteristics can be achieved while the number of frequency domain signals included in each segment is set to be as large as possible.

Figure 1:
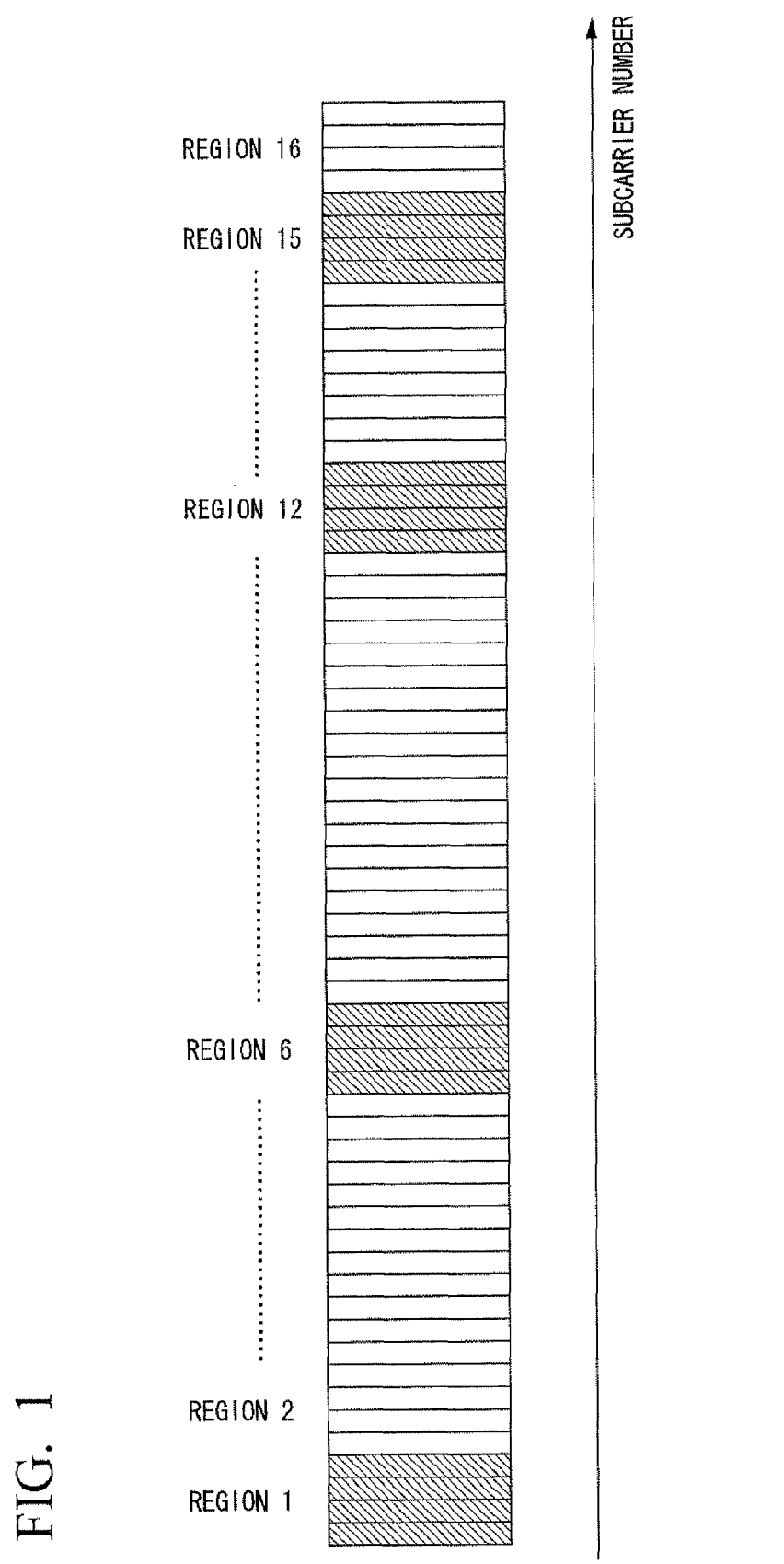
FIG. 1 illustrates an allocation example of subcarriers used in an uplink by a mobile terminal device according to first to fourth embodiments of the present invention.

| Description of Reference Numerals | |
|---|---|
| 1 | encoder |
| 2 | digital modulator |
| 3 | S/P converter |
| 4 | DFT unit |
| 5 | segmentalizing unit |
| 6 | subcarrier allocating unit |
| 7 | IDFT unit |
| 8 | GI inserter |
| 9 | P/S converter |
| 10 | power controller |
| 11 | D/A converter |
| 12 | RF unit |
| 13 | controller |
| 14 | receiver |
| 20 | mobile terminal device |
| 30 | base station device |
| 31 | transmitter |
| 32 | receiver |
| 33 | controller |
| 34 | quality measuring unit |

BEST MODE FOR CARRYING OUT THE INVENTION

In the following embodiments, DFT-s-OFDM, which is one of the spectrum control single carrier schemes, is used for a cellular uplink (from a mobile terminal device 20 to a base station device 30). It is assumed that the base station device 30 can measure using some method, an SINR (Signal to Interference plus Noise Power Ratio) of each subcarrier for each mobile terminal device 20. As an example, the mobile terminal device 20 transmits a known signal to the base station device that can measure an SINR of every subcarrier for the entire band with a predetermined period of time. Although it is assumed that a modulation scheme and the like are selected based on SINR in the embodiments, the present invention is not limited thereto. Alternatively, SIR (Signal to Noise Power Ratio) or other parameters indicative of channel qualities may be used.

It is assumed in the following embodiments that the total number of subcarriers that can be used for DFT-s-OFDM is 384, and that the mobile terminal device 20 accesses the base station device 30 using 64 subcarriers as a unit. In other words, the maximum number of 6 mobile terminal devices 20 can simultaneously access the base station device 30. Generally, the mobile terminal device 20 uses 64 frequency domain signals, i.e., all subcarriers (which is called a full rate or simply called "full"). The number of frequency domain signals can be segmentalized at a half rate (or simply "half") or at a quarter rate (or simply "quarter"). In the case of the half rate, 32 frequency domain signals of the 64 frequency domain signals, i.e., 32 subcarriers are used. In the case of the quarter rate, 16 frequency domain signals of the 64 frequency domain signals, i.e., 16 subcarriers are used. It is assumed upon segmentalization that the number of frequency domain signals included in each segment is the same. It is assumed in the following embodiments that LS-1, LS-8, and LS-16, which indicate that the numbers of frequency domain signals included in each segment are 1, 8, and 16, respectively, can be used in the case of the half rate and the quarter rate. In the case of the half rate, not only LS-1, LS-8, and LS-16, but also LS-32 indicating that the number of frequency domain signals included in each segment is 32 can be used. The above assumptions are just examples, and the present invention is not limited thereto.

Unused subcarriers in the case of the half rate and the quarter rate are not used by other mobile station devices 20, and become null carriers (which are subcarriers not used). In other words, in the case of the half rate and the quarter rate, frequency domain signals are allocated to only 16 or 32 subcarriers of 64 subcarriers, and no frequency domain signal is allocated to the remaining subcarriers. However, the mobile terminal device 20 occupies the unused subcarriers, and the unused subcarriers are not allocated to other mobile station devices 20. Consequently, the transmission efficiencies of transmission of 64 bits per symbol at the full rate, the half rate, and the quarter rate are the same.

Regarding a change of the first modulation scheme by adaptive control, it is assumed for simplification of explanation that the error coding rate is constant, only a digital modulation scheme is controlled, and three types of BPSK, QPSK, and 16QAM (16 Quadrature Amplitude Modulation) can be used. Consequently, upon communication, the mobile terminal device 20 can control three parameters, which are the number (N-sub) of subcarriers to be used (corresponding to the number of frequency domain signals), a first modulation scheme (ML), the number of frequency domain signals included in each segment (LS-x, hLS-x, and qLS-x where h and q denote half and quarter, respectively). Table 1 illustrates possible combinations.

TABLE 1

COMBINATIONS OF PARAMETERS
THAT CAN BE CONTROLLED

|  | ML | | |
|---|---|---|---|
| N-sub | 16QAM | QPSK | BPSK |
| 64 (FULL) | REGION A 256 bits LS-64 | REGION B 128 bits LS-64 | REGION C 64 bits LS-64 |
| 32 (HALF) | REGION D 128 bits hLS-32, hLS-16, hLS-8, hLS-1 | REGION E 64 bits hLS-32, hLS-16, hLS-8, hLS-1 | REGION F 32 bits hLS-32, hLS-16, hLS-8, hLS-1 |
| 16 (QUARTER) | REGION G 64 bits qLS-16, QLS-8, qLS-1 | REGION H 32 bits qLS-16, qLS-8, qLS-1 | REGION I 16 bits qLS-16, qLS-8, qLS-1 |

The leftmost column of Table 1 indicates the number of subcarriers to be used. In this Table 1, a first modulation scheme is shown for each number of subcarriers to be used. Table 1 indicates that there are 9 combinations of the regions A to I. The values in each row of Table 1 indicate, from the left, the number of subcarriers to be used, and the number of bits that can be transmitted in units of symbols when the first modulation scheme is selected. In the case of the region B, the number of subcarriers to be used is 64, the first modulation scheme is QPSK, the number of bits that can be transmitted in units of symbols is 128 bits. In this description, the number of bits to be transmitted in units of symbols is occasionally called a transmission rate. The entries immediately below the row showing the region and the bit number indicate the number of frequency domain signals included in each segment. If the number of subcarriers to be used is 64, only LS-64 can be used since segmentalization cannot be performed. The number of bits that can be transmitted does not change according to this allocation.

When LS-x, hLS-x, and qLS-x are performed while the total number of subcarriers is 64, the subcarriers are segmentalized into 64/x segments, and then subcarriers achieving high SINR are selected from the segments. In the case of LS-4 (or hLS-4, qLS-4), all the subcarriers are segmentalized into 16 segments. In the case of the half rate, 8 segments achieving higher SINR are selected and used. In the case of the quarter rate, 4 segments achieving higher SINR are selected and used. This operation is preliminarily performed for simplifying the segmentalization, and does not always have to be performed.

An example of the allocation is shown in FIG. 1. FIG. 1 illustrates an example of the quarter rate qLS-4 where the total number of subcarriers to be used is 64. In FIG. 1, all the subcarriers are segmentalized into 64/4 regions, i.e., 16 regions each including 4 subcarriers. Subcarriers included in the hatched regions 1, 6, 12, and 15 are used. Each region includes 4 subcarriers, and therefore 16 subcarriers are used in this example.

An average SINR and the PAPR characteristics differ according to the number of segmentalizations and the number of frequency domain signals included in each segment. As the number of segmentalizations increases, i.e., as the number of frequency domain signals included in each segment decreases, the SINR further improves, and the PAPR characteristics further degrades. In other words, the SINR and the PAPR characteristics are in a trade-off relationship. A degradation of the PAPR characteristics indicates a high possibility of an instantaneously-high power being output with respect to the average power.

Figure 2A:
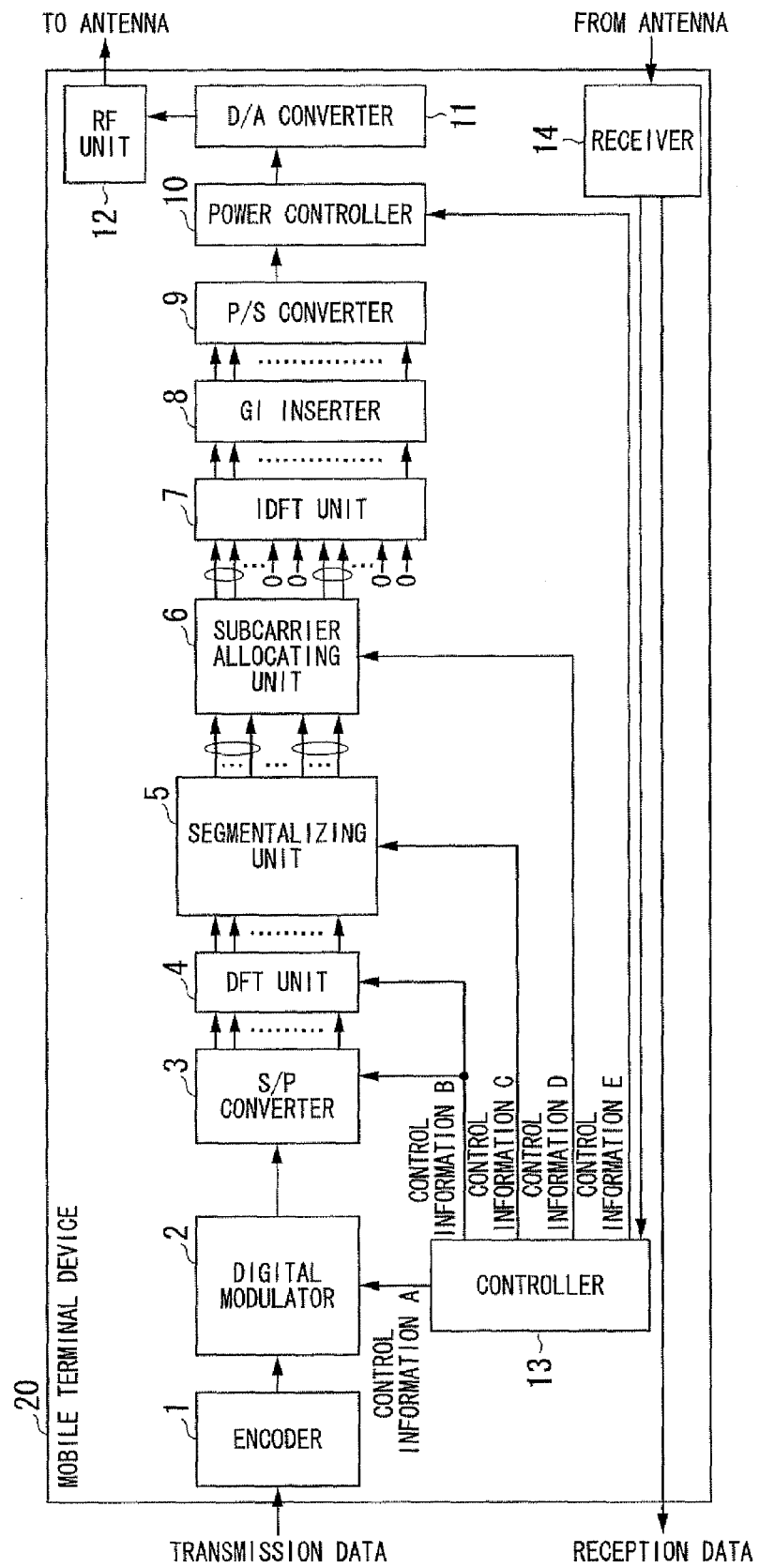
FIG. 2A is a schematic block diagram illustrating a configuration of a mobile terminal device 20 commonly used in the first to fourth embodiments.

FIG. 2A is a schematic block diagram illustrating a configuration of the mobile terminal device (wireless transmission device) 20 that uses DFT-s-OFDM and can change a first modulation scheme, the number of subcarriers to be used, and the number of frequency domain signals included in each segment. The mobile terminal device 20 includes an encoder 1, a digital modulator 2, an S/P converter 3, a DFT unit 4, a segmentalizing unit 5, a subcarrier allocating unit 6, an IDFT unit 7, a GI inserter 8, a P/S converter 8, a power controller 10, a D/A converter 11, an RF unit 12, a controller 13, and a receiver 14. The encoder 1 performs encoding, such as error correction coding, on input transmission data. The digital modulator 2 performs on the encoded transmission data, a first modulation, such as BPSK or QPSK (Quadrature Phase Shift Keying). The S/P (Serial/Parallel) converter 3 performs serial/parallel conversion to input to the DFT unit 4, time domain signals having been subjected to encoding, modulation, and the like. The DFT unit (time-frequency converter) 4 performs DFT on the time domain signals having been subjected to the serial/parallel conversion to generate frequency domain signals. The segmentalizing unit 5 segmentalizes the frequency domain signals output from the DFT unit 4 for each specified number of frequency domain signals.

The subcarrier allocating unit 6 allocates the segmentalized frequency domain signals to subcarriers to be transmitted. The IDFT unit (frequency-time converter) 7 performs IDFT on the frequency domain signals allocated to the subcarriers. The GI inserter 8 inserts a guard interval (GI) defined by the system into an output of the IDFT unit 7. The P/S converter 9 performs parallel/serial conversion on the output of the GI inserter 8. The power controller 10 controls the power of the signal output from the P/S converter 9. The digital/analog (D/A) converter 11 converts the output of the power controller 10, which is a digital signal, into an analog signal. It is assumed that the total power is not changed before and after the spatial conversion is performed by the IDFT unit 7 and the DFT unit 4. The controller 13 performs adaptive control on the digital modulator 2, the S/P converter 3, the DFT unit 4, the segmentalizing unit 5, the subcarrier allocating unit 6, and the power controller 10. The receiver 14 receives data transmitted from the base station device 30 and control information, such as channel quality. Additionally, the receiver 14 outputs the received data, and inputs the control information to the controller 13.

The mobile terminal device 20 of the present embodiment shown in FIG. 2 performs transmission using a known scheme called DFT-s-OFDM (see 3GPP R1-050702 "DFT-Spread OFDM with Pulse Shaping Filter in Frequency Domain in Evolved UTRA Uplink") However, the mobile terminal device 20 may perform transmission using another spectrum control single carrier scheme, such as a single carrier CI in which different phase rotations are added to respective time domain signals to generate frequency domain signals instead of the DFT unit 2 performing Fourier transform to generate frequency domain signals (see The 17th Annual IEEE International Symposium on Personal, Indoor and Mobile Radio Communications (PIMRC '06) "MICROSCOPIC SPECTRUM CONTROL TECHNIQUE USING CARRIER INTERFEROMETRY FOR ONE CELL REUSE SINGLE CARRIER TDMA SYSTEMS"). The same can apply to the following embodiments.

Control information A output from the controller 13 is information for specifying a first modulation scheme to the digital modulator 2. Control information B output from the controller 13 is information for specifying the number of subcarriers to be used in the S/P converter 3 and the DFT unit 4. Control information C output from the controller 13 is information for specifying the number of frequency domain signals included in each segment to the segmentalizing unit 5.

Control information D output from the controller 13 is information for specifying to the subcarrier allocating unit 6, subcarriers to be used which are specified by the base station device 30 or the like. The control information E output from the controller 13 is information for the power controller 10 to control the transmission power.

Figure 2B:
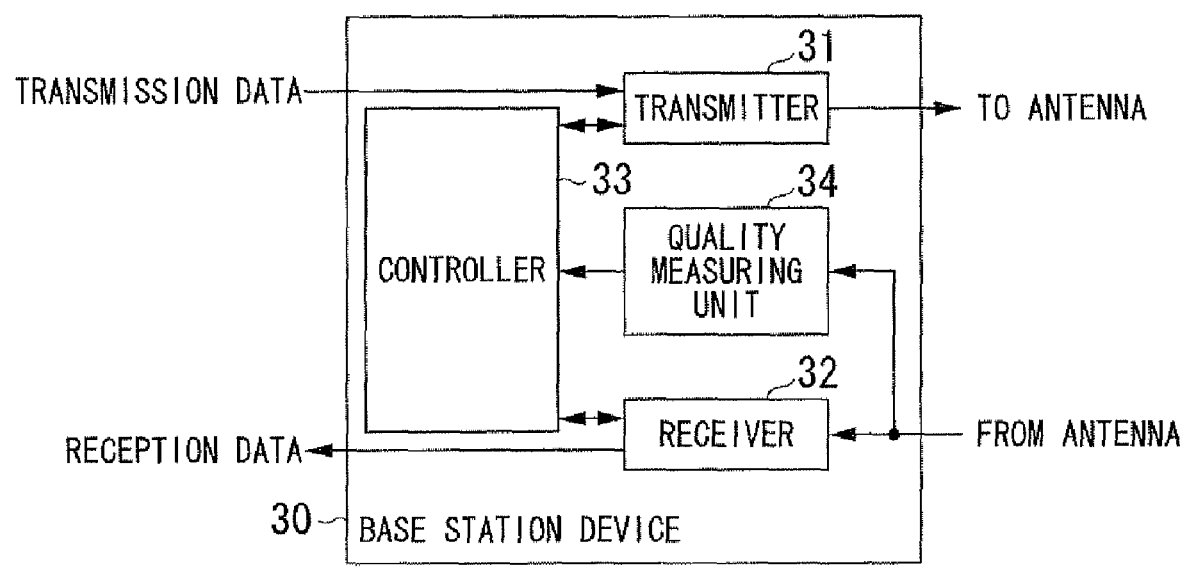
FIG. 2B is a schematic block diagram illustrating a configuration of a base station device 30 commonly used in the first to fourth embodiments.

FIG. 2B is a schematic block diagram illustrating a configuration of the base station device 30 communicating with the mobile terminal device 20. The base station device 30 includes a transmitter 31, a receiver 32, a controller 33, and a quality measuring unit 34. The transmitter 31 transmits input transmission data, and control data received from the controller 33 to the mobile terminal device 20 through an antenna. The receiver 32 receives reception data received from the mobile terminal device 20 through the antenna and the control data. Then, the receiver 32 outputs the reception data, and outputs the control data to the controller 33. The controller 33 performs uplink and downlink scheduling based on the control data received from the receiver 32. Additionally, the controller 33 orders the transmitter 31 to transmit an SINR of each mobile terminal device 20, which is received from the quality measuring unit 34, to the corresponding mobile terminal device 20. The quality measuring unit 34 measures an SINR of each subcarrier for each mobile terminal device 20, and outputs the results to the controller 33.

First Embodiment

A first embodiment explains the adaptive control achieved by changing the number of frequency domain signals included in each segment. For simplification of explanation, it is assumed that the control information A indicates one of BPSK and QPSK, and the control information B indicates 32 subcarriers that do not change (the total number of subcarriers to be used is 64). Additionally, the control information D, i.e., subcarrier allocation is suitably selected based on the number of frequency domain signals included in each segment, as will be explained later. It is assumed in the first embodiment that the base station device 30, which is the transmission destination of the mobile device 20, informs the mobile station device 20 of an SINR of each subcarrier. Although it is explained here that the controller 13 of the mobile station device 20 determines subcarriers to be used, the base station device 30 may determine subcarriers to be used and inform the mobile station device 20 of the determined subcarriers.

Figure 3:
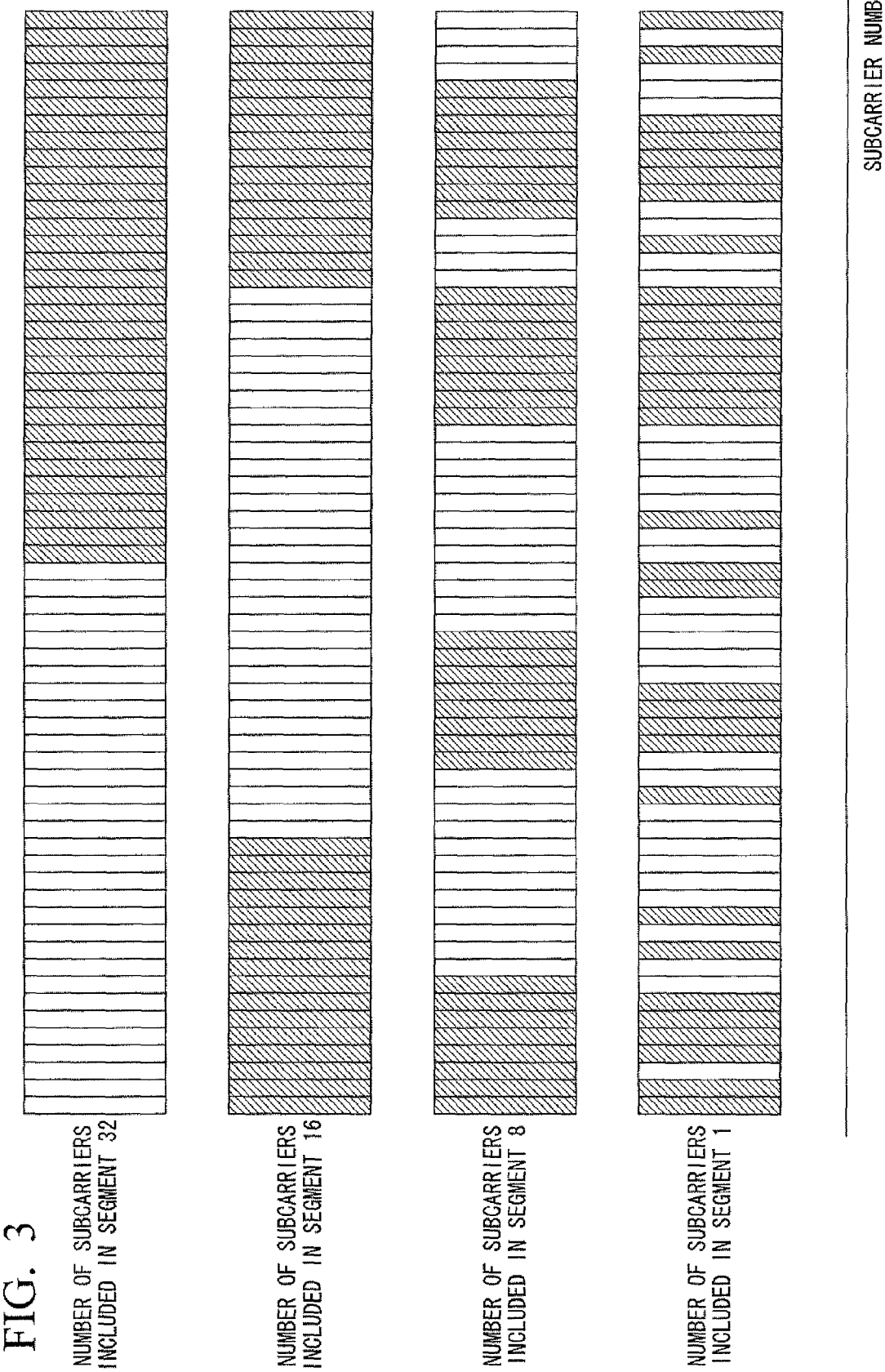
FIG. 3 illustrates an example of combinations of subcarriers achieving the best average SINR with respect to the respective numbers of frequency domain signals included in each segment.

First, the controller 13 selects a combination of subcarriers achieving the best SINR for each of the numbers of frequency domain signals included in each segment 32, 16, 8, and 1. The average SINR of the selected subcarriers is defined as hLS-xxbest, such as hLS-32best, hLS-16best, hLS-8best, or hLS-1best. FIG. 3 illustrates an example of combinations of subcarriers achieving the best average SINR for each of the numbers of frequency domain signals included in each segment. The horizontal axis denotes the subcarrier numbers from subcarrier 1 to subcarrier 64. When the number of frequency domain signals included in each segment is 8 in the case of the half rate, 32 subcarriers are used, and then the number of segments is 4. In this case, the first segment includes subcarriers 1 to 8. The second segment includes subcarriers 21 to 28. The third segment includes subcarriers 41 to 48. The fourth segment includes subcarriers 53 to 60. The controller 13 calculates hLS-xxbest for each selected combination. The hatched subcarriers shown in FIG. 3 indicate selected subcarriers.

As can be understood from FIG. 3, as the number of frequency domain signals included in each segment decreases, the freedom of subcarrier selection increases, i.e., hLS-xxbest becomes a better value. Then, the controller 13 compares each hLS-xxbest to CQ-tqpsk, which is an SINR that can satisfy a predetermined target bit error rate or a predetermined target packet error rate (these are collectively called "communication quality" in this description) when the first modulation scheme is QPSK. Then, the controller 13 selects hLS-xxbest achieving a SINR exceeding CQ-tqpsk.

Figure 4:
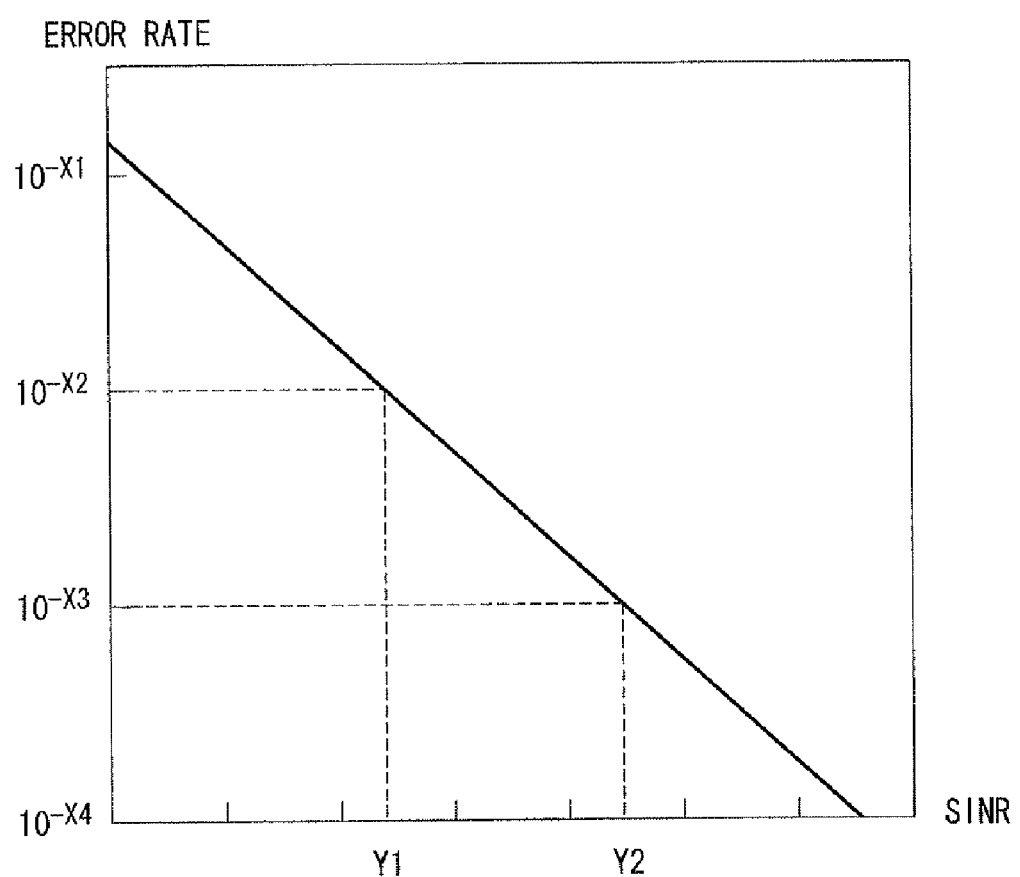
FIG. 4 illustrates an example of the QPSK error rate characteristics for a channel according to the first embodiment.

FIG. 4 illustrates an example of the QPSK error rate characteristics for a channel. The horizontal and vertical axes shown in FIG. 4 denote SINR and a bit error rate, respectively. For example, if the error rate $10^{-X2}$ is the target communication quality, CQ-tqpsk becomes Y1 (dB). Similarly, if the error rate $10^{-X3}$ is the target communication quality, CQ-tqpsk becomes Y2 (dB). The controller 13 compares each hLS-xxbest to Y1 and Y2, and selects hLS-xxbest. The controller 13 calculates the error rate characteristics with respect to the SINR as shown in FIG. 4 based on channel interference. However, the error rate characteristics with respect to a logically calculated SNR (the error rate characteristics when only white noise is present with no channel variation) may be used.

If multiple hLS-xxbest are present, hLS-xxbest whose value of xx is larger, i.e., whose value of a PAPR is stochastically smaller, is selected.

If hLS-xxbest exceeding CQ-tqpsk is not present, the controller 13 compares hLS-xxbest to target CQ-tbpsk when the first modulation scheme is BPSK. Then, the controller 13 selects hLS-xxbest that can achieve an SINR exceeding CQ-tbpsk in a similar manner. If multiple hLS-xxbest are present, hLS-xxbest whose value of xx is larger, i.e., whose value of a PAPR is stochastically smaller, is selected.

In this manner, the controller 13 selects the value of xx indicative of the number of frequency domain signals included in each segment, and selects the first modulation scheme at the same time. For example, if hLS-8best is selected with respect to CQ-tqpsk, the controller 13 outputs control information A indicating that BPSK is to be selected, and control information C indicating that the number of frequency domain signals included in each segment is 8. Thus, among first modulation schemes satisfying a target SINR, a parameter corresponding to the larger number of frequency domain signals included in each segment is set, and thereby enabling a selection of a transmission scheme achieving better PAPR characteristics while satisfying the target SINR.

By selecting a transmission scheme achieving better PAPR characteristics, an instantaneously-high power can be stochastically prevented. Therefore, when an instantaneous power becomes larger depending on data, and signal elements degrade due to nonlinear distortion upon power amplification, an instantaneous degradation of a communication quality (i.e., an error occurs depending on transmission data) can be prevented. Additionally, the effect of signals intruding into out-of-band communication and affecting another communication system can be prevented. It is assumed in the first embodiment that multiple mobile terminal devices 20 simultaneously access the base station device 30 using FDM (Frequency Division Multiplex). Therefore, the effect on out-of-band communications, i.e., the effect on a transmission band of another mobile terminal device 20 can be prevented.

Figure 5:
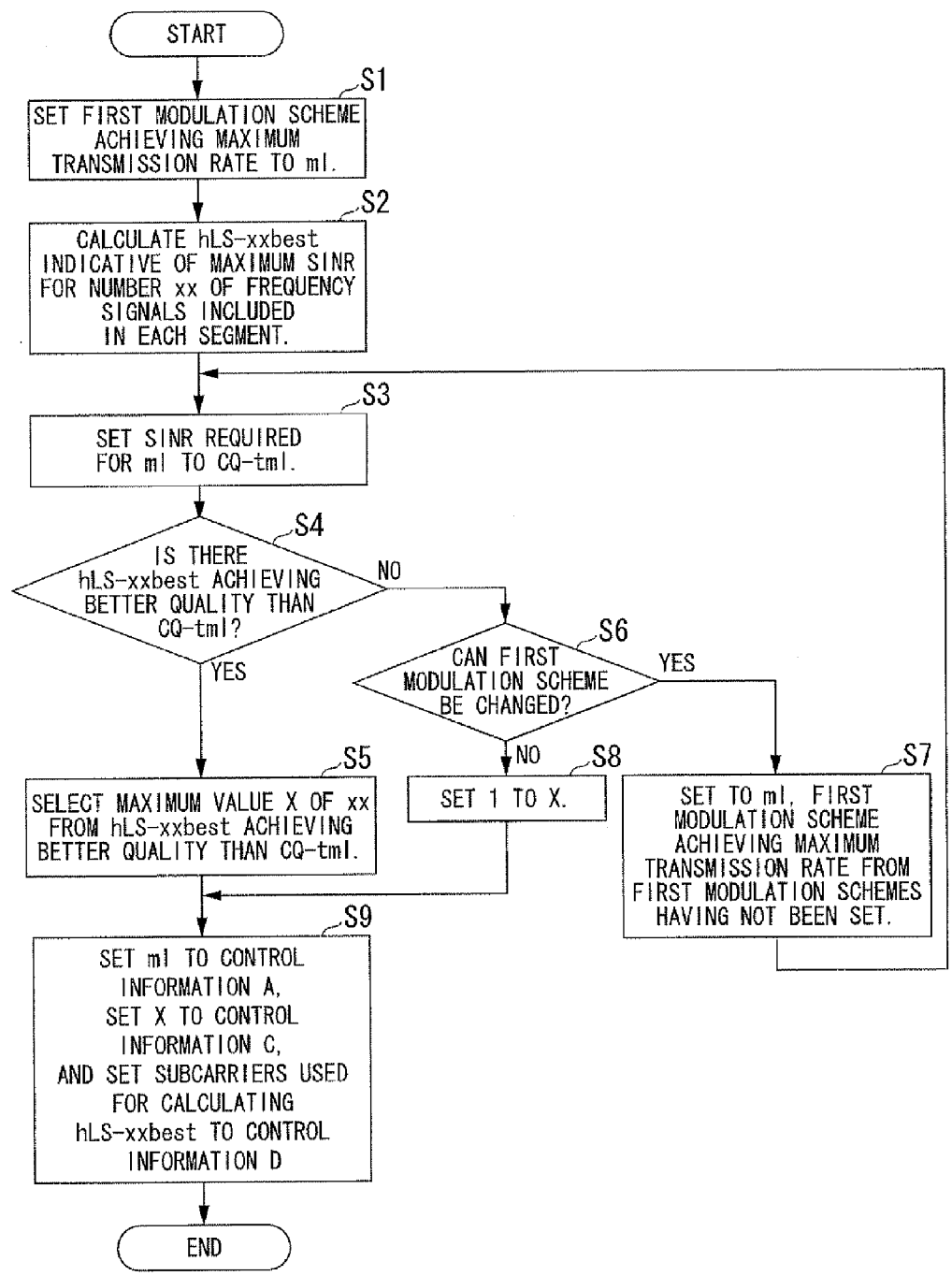
FIG. 5 illustrates a flowchart for a controller 13 according to the first embodiment to decide a first modulation scheme and the number of frequency domain signals included in each segment.

FIG. 5 is a flowchart for the controller 13 to determine a first modulation scheme and the number of frequency domain signals included in each segment. In a first step, the controller 13 initiates the first modulation. The controller 13 selects a modulation scheme achieving the maximum transmission rate in the system and sets the modulation scheme to a parameter ml (S1). In the aforementioned case, QPSK is set to ml. Then, the controller 13 selects for each value of xx that is the number of frequency domain signals included in each segment, a subcarrier group achieving the maximum SINR. Then, the controller 13 substitutes an average SINR for all the subcarriers to be used into LS-xxbest (S2). Then, the controller 13 sets to the parameter CQ-tml, an SINR required for using the modulation scheme set to the parameter ml.

The parameter CQ-tml is determined based on a required communication quality, which is SINR in the first embodiment. Then, the controller 13 determines whether or not hLS-xxbest achieving an SINR exceeding the parameter CQ-tml is present among multiple pieces of hLS-xxbest (S4). If the controller 13 determines that hLS-xxbest achieving an SINR exceeding the parameter CQ-tml is present, the controller 13 selects from pieces of hLS-xxbest achieving better quality than the parameter CQ-tml, one having the largest value of xx that is the number of frequency domain signals included in each segment. Then, the controller 13 sets the value of the number xx of frequency domain signals included in each segment to the parameter X (S5).

Then, the controller 13 finally determines each control information piece. In other words, the controller 13 sets the parameter ml indicative of the first modulation scheme to the control information A. The controller 13 sets to the control information C, the parameter X indicative of the number of frequency domain signals included in each segment. The controller 13 sets to the control information D, information indicative of the subcarriers selected for calculating hLS-xxbest when the parameter X is the number of frequency domain signals included in each segment. On the other hand, if the controller 13 determines in step S4 that hLS-xxbest achieving an SINR exceeding the parameter CQ-tml is not present, the controller 13 determines based on the setting of the parameter ml whether or not the first modulation scheme can be changed. In other words, if a first modulation scheme having not been set is present in steps S1 and S7, the controller 13 determines that the first modulation scheme can be changed. If a first modulation scheme having not been set is not present in steps S1 and S7, the controller 13 determines that the first modulation scheme cannot be changed.

If the controller 13 determines in step S6 that the first modulation scheme can be changed, the controller 13 sets to the parameter ml, a first modulation scheme achieving the maximum transmission rate among first modulation schemes having not been set in steps S1 and S7, and then returns to step S3 (S7). If the controller 13 determines in step S6 that the first modulation scheme cannot be changed, the controller 13 sets 1 to the parameter X indicative of the number of frequency domain signals included in each segment, i.e., sets X=1, and proceeds to step S9 (S8). Step S8 indicates that parameters cannot be changed any more. Although it can be possible to terminate the flow here and not to perform transmission, 1 is set to the parameter X in this case and communication using LS-1 at the full rate is performed in which the first modulation scheme achieving the maximum resistance against noise and interference, and subcarriers achieving better qualities can be selected, and the number of frequency domain signals included in each segment is 1.

Although it is assumed here that all values set to the number of frequency domain signals included in each segment can be selected, some restriction may be made based on a condition of the mobile terminal device 20, for example, the remaining amount of power supply or a required transmission power. When the remaining amount of power supply is small or when high transmission power is required, if a signal having a large instantaneous power is input to an amplifier, an output thereof has a high possibility of being distorted. In such a case, a restriction such that 1 is not set to the number of frequency domain signals included in each segment, i.e., LS-1 is not used, may be made, and thereby the communication quality can be improved.

As shown in the beginning of the first embodiment, the control information shown in FIG. 2 may be determined by the base station device 30. Even when the control information is determined by the controller 33 of the base station device 30, the same flowchart shown in FIG. 5 can be used for the determination process. The base station device 30 informs the mobile terminal device 20 of the determined control information through the downlink. The receiver 14 of the mobile terminal device 20 receives the information, and the controller 13 sets the value indicated by the received information to each control information piece.

Thus, based on SINRs of subcarriers to which frequency domain signals are allocated, a largest value among values, which can satisfy a predetermined communication quality and the best transmission rate, is set to the number of frequency domain signals included in each segment. For this reason, the number of frequency domain signals included in each segment becomes the largest within the range where the best communication efficiency can be achieved. Consequently, excellent PAPR characteristics can be achieved. Therefore, distortion of transmission signals, which is caused by a deviation from the linear region of an amplifier at the time of amplification of the transmission power, can be prevented. Further, an occurrence of waves interfering with other cells can be prevented.

Second Embodiment

A mobile terminal device and a base station device that are used in a second embodiment are the same as ones explained in the first embodiment with reference to FIGS. 2A and 2B except for the following. In other words, the control information pieces C and D, which are output from the controller of the mobile terminal device, differ. Consequently, the configuration of the controller 13 is changed with this respect. The same can apply to the base station device. This situation is explained here. The second embodiment explains a different method from that of the first embodiment where parameters shown in Table 1 are selected. Therefore, the total number of subcarriers to be used can be selected from 64 (full), 32 (half), and 16 (quarter). A first modulation scheme can be selected from 16QAM, QPSK, and BPSK. The number of frequency domain signals included in each segment can be selected from the types shown in Table 1, i.e., from LS-1, LS-8, LS-16, LS-32, and LS-64. An isolated cell (which is less affected by interference) is assumed in the second embodiment. In this case, noise is the primary factor of SINRs.

When a predetermined target communication quality is Err-t, it is assumed that average SINRs required for the respective first modulation schemes are CQ-tbpsk, CQ-tqpsk, and CQ-t16qam.

First, the maximum average SINR with respect to each of the numbers of frequency domain signals included in each segment is calculated. In the case of the full rate, all the subcarriers are used, and therefore the average SINR is uniquely determined, which is defined as LS-64best. In the half rate, the maximum average SINR differs depending on the number of frequency domain signals included in each segment, which are defined as hLS-32best, hLS-16best, hLS-8best, and hLS-1best. In the case of the quarter rate, similar to the case of the half rate, the determined average SINRs are defined as hLS-16best, hLS-8best, and hLS-1best. Similar to the first embodiment, the controller 13 of the mobile terminal device 20 or the base station device 30 selects parameters as explained hereinafter.

An SINR required for achieving a target communication quality for each first communication scheme (hereinafter, "desired SINR") and the SINR calculated for each of the numbers of frequency domain signals included in each segment are compared to select combinations of modulation schemes achieving SINRs exceeding the desired SINR. Table 2 illustrates an example of the selection results. In Table 2, the combinations crossed out with two lines are combinations of modulation schemes that cannot satisfy the desired SINR. In Table 2 and other Tables shown later, "best" of hLS-xxbest is omitted.

TABLE 2

SELECTED PARAMETERS

| | ML | | |
|---|---|---|---|
| N-sub | 16QAM | QPSK | BPSK |
| 64 (FULL) | (REGION A) | (REGION B) | (REGION C) |
| 32 (HALF) | hLS-1 (REGION D) | hLS-32, hLS-16, hLS-8, hLS-1 (REGION E) | hLS-32, hLS-16, hLS-8, hLS-1 (REGION F) |
| 16 (QUARTER) | qLS-8, qLS-1 (REGION G) | qLS-16, qLS-8, qLS-1 (REGION H) | qLS-16, qLS-8, qLS-1 (REGION I) |

If a combination achieving the maximum transmission rate is selected among the combinations remaining as candidates shown in Table 2, the communication quality Err-t is satisfied, and the largest amount of data can be transmitted in a unit of time, thereby improving the communication efficiency. The full-QPSK LS-64 and the half-16QAM hLS-1 are the candidates in the case of Table 2. If multiple candidates are included in the selected region, one of hLS-xx and qLS-xx, which has the largest value of xx, is selected. This is because the PAPR characteristics are better as a value of xx is larger. Since only one candidate is included in the selected region shown in Table 2, this operation is not necessary. Although any one of the hLS-xx or qLS-xx has to be selected, it is not necessary to consider effects on another system in the case of an isolated cell. In such a case, an optimal parameter is selected based on the determination criteria of each terminal.

It can be considered as one method that a first modulation scheme using the smaller number of signals is selected (i.e., QPSK (2 bits) is selected rather than 16QAM (4 bits), and BPSK (1 bit) is selected rather than QPSK). This is because the first modulation scheme using the smaller number of signals is more resistant to colored noise. In the case of the results of the first SINR comparison shown in Table 2, the full-QPSK LS-64 is selected consequently. QPSK is set to the control information A (first modulation scheme) shown in FIG. 2. 64 is set to the control information B (the number of subcarriers). 64 is set to the control information C (the number of frequency domain signals included in each segment). The subcarriers used for setting LS-64best are set to the control information D (subcarriers).

Alternatively, a method of selecting parameters in consideration of the PAPR characteristics can be considered. In this case, when the total number of subcarriers to be used is small, it has to be considered that the total transmission power (i.e., average power) becomes small.

By selecting parameters in this manner, the target communication quality is satisfied, and the transmission rate can be maximized, thereby minimizing a degradation of the PAPR characteristics.

Third Embodiment

A mobile terminal device and a base station device that are used in a third embodiment are the same as those explained in the first embodiment with reference to FIGS. 2A and 2B except for the following. In other words, the control information pieces C and D, which are output from the controller of the mobile terminal device, differ. Consequently, the configuration of the controller 13 is changed in this respect. The same can apply to the base station device. This situation is explained here. The third embodiment explains a case where DFT-s-OFDM, in which adaptive control is performed, is used for a single frequency reuse cellular system. The single frequency reuse cellular system is a system in which the same frequency band is used by every cell, and therefore high frequency utilization efficiency can be achieved, but the effects of interference signals from neighboring cells are problematic. In other words, interferences are primary factors of SINRs in the system.

To explain the third embodiment, parameters to be used here are the same as those shown in the second embodiment. Similar to the first and second embodiments, the controller 13 of the mobile terminal device 20 or the base station device 30 selects parameters as will be explained hereinafter.

It is necessary in the single frequency reuse cellular system to consider effects on neighboring cells.

For this reason, the characteristics of the entire system are improved in the third embodiment if parameters are selected in descending order of the transmission rate and the number of subcarriers to be used.

A desired SINR for each first modulation scheme and the SINR calculated for each of the numbers of frequency domain signals included in each segment are compared to select combinations of modulation schemes achieving SINRs exceeding the desired SINR. Table 3 illustrates an example of the selection results. In Table 3, the combinations crossed out with two lines are combinations that cannot satisfy the desired SINR.

TABLE 3

SELECTED PARAMETERS

| | ML | | |
|---|---|---|---|
| N-sub | 16QAM | QPSK | BPSK |
| 64 (FULL) | (REGION A) | (REGION B) | (REGION C) |
| 32 (HALF) | (REGION D) | hLS-16, hLS-8, hLS-1 (REGION E) | hLS-32, hLS-16, hLS-8, hLS-1 (REGION F) |
| 16 (QUARTER) | qLS-1 (REGION G) | qLS-16, qLS-8, qLS-1 (REGION H) | qLS-16, qLS-8, qLS-1 (REGION I) |

If a combination achieving the maximum transmission rate is selected from the combinations remaining as candidates shown in Table 3, the communication quality Err-t is satisfied, and the largest amount of data can be transmitted in a unit of time, thereby improving the communication efficiency. In the case of Table 3, 5 combinations of the full-BPSK LS-64, the half-QPSK hLS-1 to 16, and the quarter-16QAM qLS-1 are the candidates. Regarding which one is to be selected, as explained above, a parameter achieving less transmission power per bit, i.e. a parameter achieving the smaller number of subcarriers, is preferably selected in consideration of the effects on other cells.

In the case of the results of the first SINR comparison shown in Table 3, the quarter-16QAM qLS-1 is selected consequently. This is because the transmission rate is prioritized, and next the smaller number of subcarriers to be used is prioritized, thereby improving the communication efficiency of the entire system. 16QAM is set to the control information A (first modulation scheme) shown in FIG. 2. 16 is set to the control information B (the number of subcarriers). 1 is set to the control information C (the number of frequency domain signals included in each segment). The subcarriers used for setting qLS-1best are set to the control information D (subcarriers).

According to the parameter selecting method, the number of subcarriers to be used in each cell is controlled to be small, resulting in a lower inter-cell interference. The transmission rate can be maximized while the target communication quality is satisfied. Further, interference with other cells can be reduced. Moreover, a degradation of the PAPR characteristics can be minimized.

The isolated cell and the cell affected by interference are assumed in the second and third embodiments, respectively. The interference power within the communication band is estimated. Then, the estimated interference power is compared to a predetermined threshold. Thus, whether the dependency of SINR on the interference power is high or low may be determined Then, the parameter selecting method of the second embodiment and the parameter selecting method of the third embodiment may be adaptively switched.

Fourth Embodiment

A mobile terminal device and a base station device that are used in a fourth embodiment are the same as those explained in the first embodiment with reference to FIGS. 2A and 2B except for the following. In other words, the control information pieces C and D, which are output from the controller of the mobile terminal device, differ. Consequently, the configuration of the controller 13 is changed in this respect. The same can apply to the base station device. This situation is explained here. The second and third embodiments have explained the case where the transmission power is not controlled with respect to the parameter to be selected. In this case, the total transmission power in the case of the half rate and the quarter rate is smaller than in the case of the full rate. The fourth embodiment explains the case where the transmission power is controlled to be constant. Similar to the first to third embodiments, the controller 13 of the mobile terminal device 20 or the base station device 30 selects parameters as explained later.

The power control is performed based on the control information E shown in FIG. 2. If the half rate is selected, the signal power is controlled to be double the signal power in the case of the full rate. If the quarter rate is selected, the signal power is controlled to be four times the signal power in the case of the full rate.

A desired SINR for each first modulation scheme and the SINR calculated for each of the numbers of frequency domain signals included in each segment are compared to select combinations of modulation schemes achieving SINR exceeding the desired SINR. Table 4 illustrates an example of the selection results. The transmission power is controlled in the fourth embodiment. Therefore, if the transmission rate is the same, the transmission signal power per bit is the same. Candidates in regions corresponding to the same transmission rate are likely to remain as the final selection candidates. Table 4 illustrates candidates of parameters selected based on signal quality. In Table 4, the combinations crossed out with two lines are combinations that cannot satisfy the desired SINR.

TABLE 4

| | SELECTED PARAMETERS | | |
|---|---|---|---|
| | ML | | |
| N-sub | 16QAM | QPSK | BPSK |
| 64 (FULL) | (REGION A) | (REGION B) | LS-64 (REGION C) |
| 32 (HALF) | (REGION D) | hLS-16, hLS-8, hLS-1 (REGION E) | hLS-32, hLS-16, hLS-8, hLS-1 (REGION F) |
| 16 (QUARTER) | qLS-16, qLS-8, qLS-1 (REGION G) | qLS-16, qLS-8, qLS-1 (REGION H) | qLS-16, qLS-8, qLS-1 (REGION I) |

A parameter is selected from these candidates shown in Table 4 based on a condition of the mobile terminal device 20. For example, in the case of the isolated cell shown in the second embodiment, a combination achieving the largest number of frequency domain signals included in each segment is selected in consideration of only the PAPR characteristics. Consequently, the full-BPSK LS-64 is preferably selected. In the case of the single frequency reuse cellular system shown in the third embodiment, the quarter 16QAM achieving the smallest number of subcarriers to be used is preferably selected in consideration of the effects on other cells. In the case of the mobile terminal device 20 located at the cell edge, qLS-16best achieving the better PAPR characteristics is selected since an amplifier for amplifying the transmission power is required to be used as efficiently as possible. Consequently, the qLS-16best achieving the better PAPR characteristics is selected.

The mobile terminal device 20 having the small remaining amount of power supply may delete a combination causing poor PAPR characteristics from the selection candidates. In this case, hLS-1, hLS-8, qLS-1, and qLS-8 are deleted from the candidates. Consequently, one of the full-BPSK LS-64best, the half-QPSK hLS-16best, the half-QPSK hLS-32best, and the quarter-16QAM qLS-16best is selected.

Figure 6:
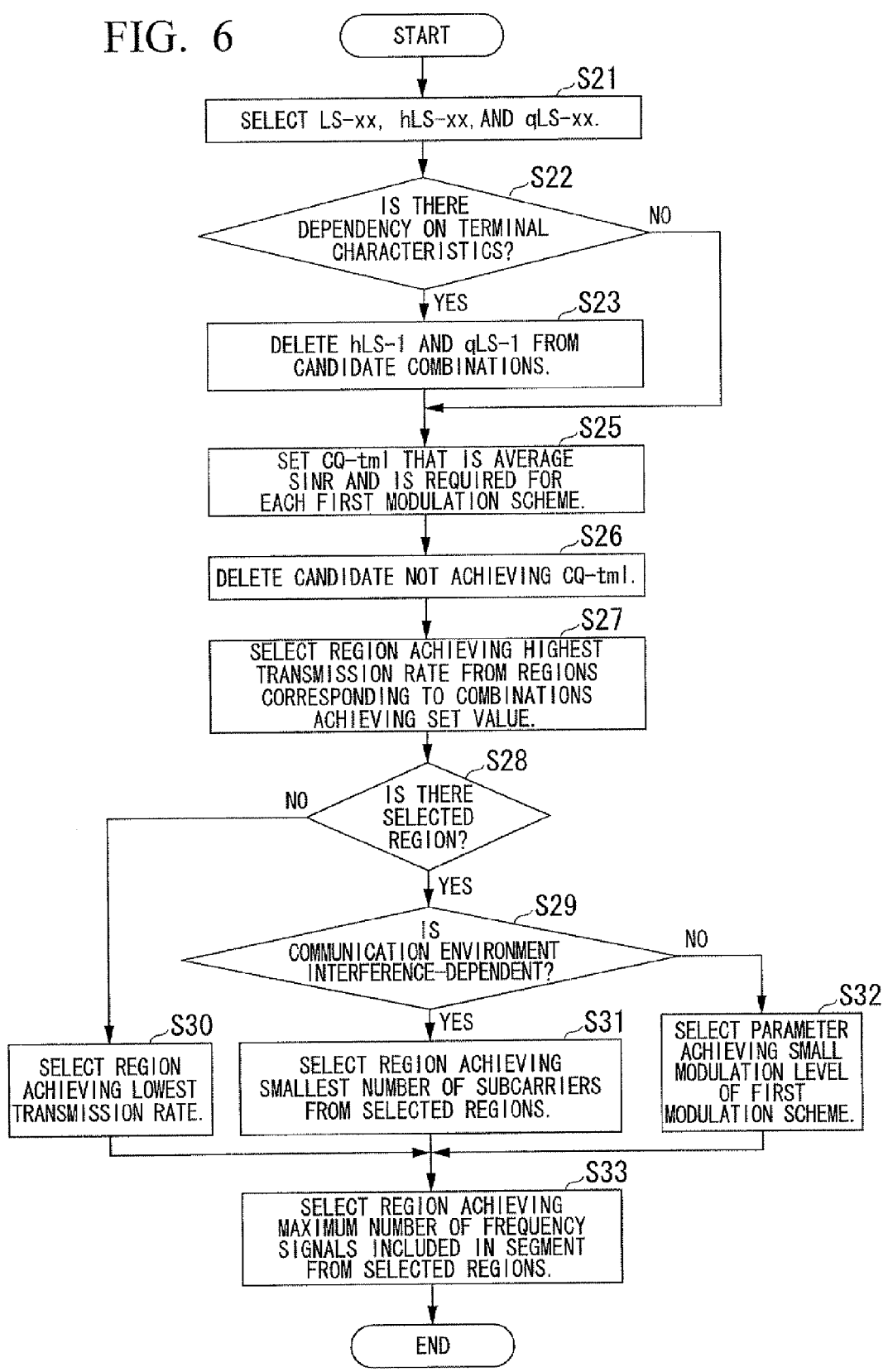
FIG. 6 illustrates a flowchart of adaptively exchanging operations shown in the second and third embodiments according to a fourth embodiment of the present invention.
Figure 7:
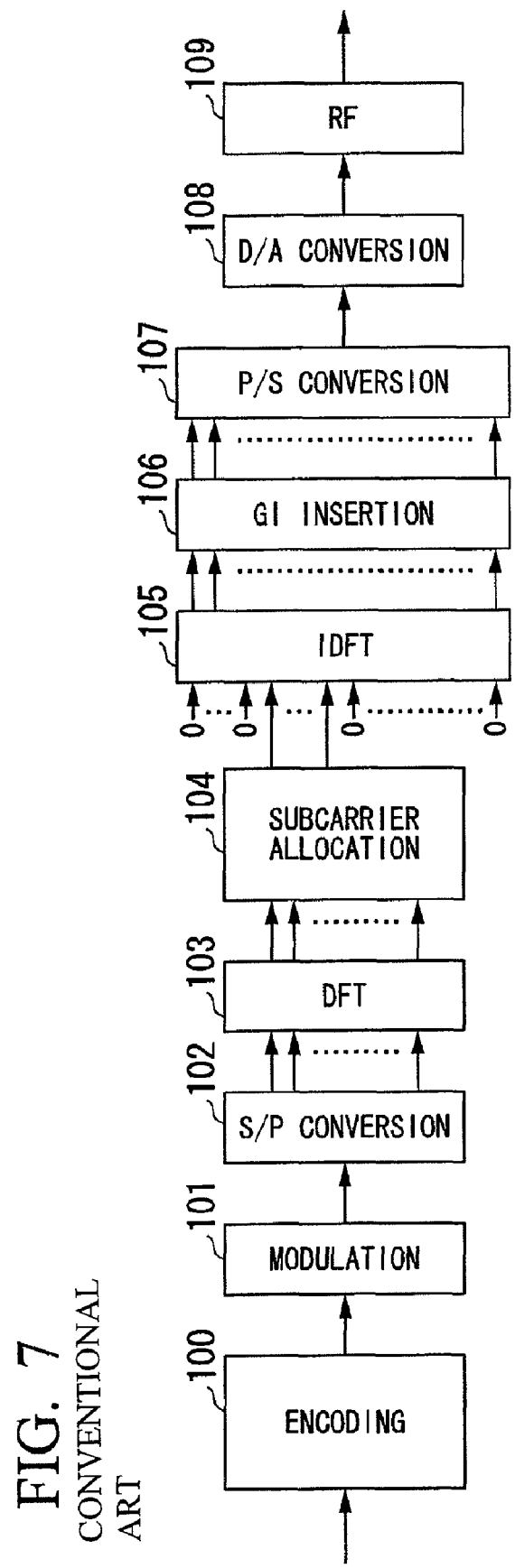
FIG. 7 is a schematic block diagram illustrating a configuration of a transmission device using a conventional DFT-s-OFDM.
Figure 8A:
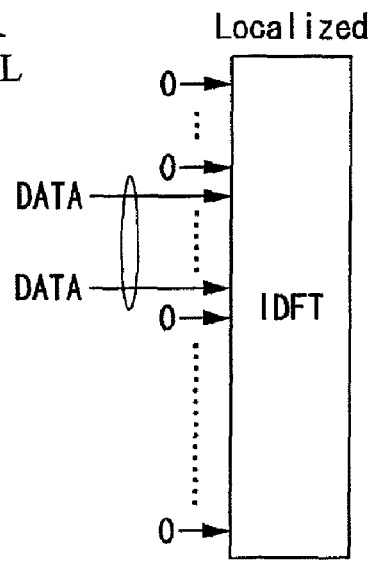
FIG. 8A illustrates inputs of an IDFT unit when a conventional L allocation is used.
Figure 8B:
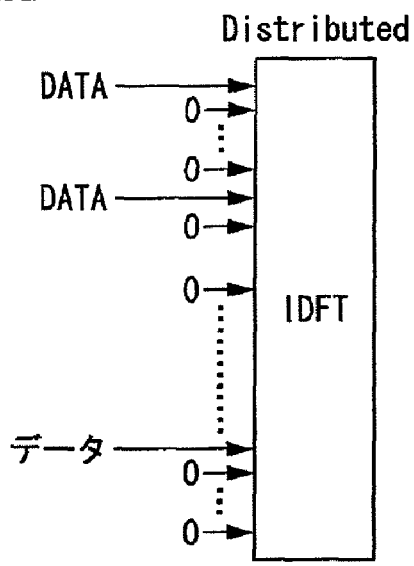
FIG. 8B illustrates inputs of the IDFT unit when a conventional D allocation is used.

FIG. 6 is a flowchart of adaptively switching the operations of the second and third embodiments according to the fourth embodiment. The second and third embodiments can be implemented by using a part of this flowchart.

First, the controller 13 selects subcarriers achieving the best average SINR for each combination of a first modulation scheme and the number of frequency domain signals included in each segment. Then, the controller 13 sets the average SINR of the selected subcarriers to LS-xx, hLS-xx, and qLS-xx (S21). Then, the controller 13 determines whether or not the mobile terminal device 20 is dependent on terminal characteristics (S22). In other words, the controller 13 determines whether or not the mobile terminal device 20 tolerates the PAPR characteristics in consideration of several factors of each mobile terminal device 20, such as the aforementioned remaining amount of power supply, or the utilization efficiency of an amplifier for amplifying the transmission power. For example, if the remaining mount of power supply is small, and if the amount of power that can be supplied is smaller than a predetermined threshold, it is determined that the mobile terminal device 20 does not tolerate the PAPR characteristics. Alternatively, if the transmission power is greater than a predetermined threshold and exceeds a linear region of the amplifier at a peak, it is determined that the mobile terminal device 20 does not tolerate the PAPR characteristics. If the mobile terminal device 20 does not tolerate the PAPR characteristics, it is determined that the mobile terminal device 20 is dependent on the terminal characteristics. If it is determined in step S22 that the mobile terminal device 20 is likely to be affected by a degradation of the PAPR characteristics, i.e., if it is determined that the mobile terminal device 20 is dependent on the terminal characteristics, the controller 13 preliminarily deletes from the combinations of parameters, LS-1, hLS-1, and qLS-1 causing the poor PAPR characteristics (S23). It is assumed here that the combination satisfying a condition that the number of frequency domain signals included in each segment is 1 is deleted. However, combinations satisfying a condition that the number of frequency domain signals included in each segment is equal to or smaller than a predetermined threshold, such as 2 or less, 4 or less, or the like, may be deleted.

If it is determined in step S22 that the mobile terminal device 20 does not tolerate the PAPR characteristics, after step S23, the controller 13 sets CQ-tml, which is the average SINR satisfying the desired communication quality required for each first modulation scheme (S25). The CQ-tml differs depending on a first modulation scheme. Then, the controller 13 deletes a candidate not satisfying CQ-tml (S26). The operation of step S26 corresponds to the operation of crossing out with two lines candidates shown in Tables 2 and 3 shown in the second and third embodiments. Then, the controller 13 selects a region achieving the maximum transmission rate from regions corresponding to the modulation scheme satisfying the set desired quality (S27). At this time, multiple regions might be selected.

The regions indicate the regions A to I shown in Table. Multiple candidates may be included in the selected region correspondingly to the number of frequency domain signals included in each segment.

Then, the controller 13 determines whether or not the region selected in step S27 is present (S28). If it is determined that the selected region is not present, the controller 13 proceeds to the step S30, selects a region achieving the lowest transmission rate from among all the regions, and proceeds to step S33. On the other hand, if it is determined that the region selected in step S28 is present, the controller 13 determines whether or not the communication environment of the mobile terminal device 20 is interference-dependent (S29). This determination is performed based on whether or not the absolute amount of interference power is equal to or greater than a threshold. Alternatively, whether or not an isolated cell or interference cell is present may be determined in step S29. If it is determined in step S29 that the communication environment is interference-dependent, the controller 13 selects a region achieving the smallest number of subcarriers to be used from the regions selected in step S27 (S31), and then proceeds to step S33.

If it is determined in step S29 that the communication environment is not interference-dependent, the controller 13 selects a region achieving the smaller number of modulation levels of the first modulation scheme from the regions selected in step S27 (S32), and then proceeds to step S33. This branching corresponds to the second embodiment. The controller 13 selects in step S33, a region achieving the largest number of frequency domain signals included in each segment from the regions selected in any one of steps S30, S31, and S32. Further, the controller 13 performs power control based on the rate of the selected region, and thus the flowchart ends.

Hereinafter, a more specific case is explained. As an example, a case where parameters to be used are shown in Table 1, a communication environment is a single frequency reuse system (which is highly interference-dependent), transmission power control is performed based on the number of subcarriers to be used, and the mobile terminal device 20 is greatly affected by a degradation of the PAPR, is explained.

In such a case, the controller 13 deletes the combinations of hLS-1 and qLS-1 from the candidates in step S23. Table 4 shows the results of SINR comparison. The controller 13 leaves the regions C, E, and G in step S27.

Since the selected regions are present in step S28, the controller 13 proceeds to step S29. Since the controller 13 determines in step S29 that the communication environment is highly interference-dependent, the controller 13 selects the region G in step S31. This branching corresponds to the third embodiment. Then, the controller 13 selects LS16 in step S33. Consequently, 16QAM is set to the control information A, 16 is set to the control information B, 16 is set to the control information C, and the subcarriers used for calculation in step S21 are allocated to the control information D.

Such controls enable maximization of the transmission rate and minimization of a degradation of the PAPR characteristics in consideration of dependency on the terminal characteristics and interference with other cells.

Programs for implementing the functions of the encoder 1, the digital modulator 2, the S/P converter 3, the DFT unit 3, the segmentalizing unit 5, the subcarrier allocating unit 6, the IDFT unit 7, the GI inserter 8, the P/S converter 9, the power controller 10, and the controller 13, which are shown in FIG. 2, may be stored in a computer-readable recording medium, and thereby operations of the respective units may be performed by a computer system reading the programs.

The "computer system" described here includes OS and hardware, such as peripheral devices.

The "computer-readable recording medium" includes a portable medium, such as a flexible disk, an optical disc, an ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as a volatile memory in a computer system of a server or a client in the above case. The program may be one for implementing a part of the aforementioned functions or one for implementing the aforementioned functions by combining another program stored in the computer system.

Although the embodiments of the present invention are explained with reference to the accompanying drawings, specific configurations are not limited to the embodiments, and various modifications can be made without departing from the scope of the present invention.

INDUSTRIAL APPLICABILITY

The present invention is suitable, but is not limited to a mobile communication system using a spectrum control single carrier communication scheme in an uplink.

The invention claimed is:
1. A base station device comprising:
a controller configured to select one of first and second methods to assign a plurality of subcarriers to a mobile terminal device, the first method being such that the plurality of subcarriers are non-continuously arranged the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, the second method being such that the plurality of subcarriers are arranged continuously to form a single cluster of subcarriers, and the controller being configured to control a modulation scheme, a coding rate, the number of assigned subcarriers and a transmission power to be used for the mobile terminal device to transmit transmission data; and a transmitter configured to transmit, to the mobile terminal device, a first information related to the one of the first and second methods selected.

2. The base station device according to claim 1, wherein the controller is configured to control the modulation scheme, the coding rate, the number of assigned subcarriers and the transmission power to be used for the mobile terminal device to transmit the transmission data to be used for the mobile terminal device to transmit transmission data, so as to satisfy a predetermined quality of communication.

3. The base station device according to claim 1, further comprising:
a receiver configured to receive, from the mobile terminal device, information indicating a limitation of the first and second methods indicating how to map data to the plurality of subcarriers of for the mobile terminal device,
wherein the controller is configured to refer to the information received, in order to select one of the first and second methods.

4. The base station device according to claim 3, wherein the controller is configured to select one of a plurality of combinations between the first and second methods and the modulation scheme, the coding rate, the number of assigned subcarriers and the transmission power based on a channel condition.

5. The base station device according to claim 1, wherein the transmitter is further configured to transmit a second information related to modulation scheme the coding rate, the number of arranged subcarriers and the transmission power controlled by the controller.

6. The base station device according to claim 1, wherein the controller is configured to select the first method when the mobile terminal device is present on a cell edge.

7. A mobile terminal device comprising:
a receiver configured to receive a first information indicating either of first and second methods to arrange a plurality of subcarriers to be used for transmitting transmission data,
the first method being such that the plurality of subcarriers are non-continuously arranged the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster,
the second method being such that the plurality of subcarriers are arranged continuously to form a single cluster of subcarriers, and a second information indicating modulation scheme a coding rate, the number of assigned subcarriers and a transmission power for transmitting transmission data; and
an antenna configured to transmit, to a base station device, the transmission data based on the first information and the second information received.

8. The mobile terminal device according to claim 7, wherein the antenna is further configured to transmit the transmission data based on an information related to out-band radiation.

9. The mobile terminal device according to claim 7, further comprising:
a controller configured to set the maximum value of the transmission power to be larger than if the first method is received, if the second method is received.

10. The mobile terminal device according to claim 7, wherein the antenna is further configured to transmit, to a base station device, information indicating a limitation of the first and second methods indicating how to map data to the plurality of subcarriers.

11. The mobile terminal device according to claim 7, further comprising:
a modulator configured to modulate the transmission data based on the second information received;
a converter configured to convert the transmission data modulated into a plurality of frequency domain signals; and
an allocating unit configured to allocate the plurality of frequency domain signals onto the plurality of subcarriers arranged based on the first information received.

12. A wireless communication system comprising:
a base station device; and
a mobile terminal device,
wherein the base station device comprises:
a controller configured to select one of first and second methods to assign a plurality of subcarriers to a mobile terminal device,
the first method being such that the plurality of subcarriers are non-continuously arranged the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and
the second method being such that the plurality of subcarriers are arranged continuously to form a single cluster of subcarriers,
the controller being further configured to control a modulation scheme a coding rate, the number of assigned subcarriers and a transmission power to be used for the mobile terminal device to transmit transmission data; and
a transmitter configured to transmit a first information related to the one of the first and second methods and a second information related to the modulation scheme the coding rate, the number of assigned subcarriers and the transmission power, and
the mobile terminal device comprises:
a receiver configured to receive, from the base station device, the first information and the second information; and
an antenna configured to transmit the transmission data based on the first information and second information received.

13. A wireless communication method, comprising:
receiving a first information indicating either of first and second methods to arrange a plurality of subcarriers to be used for transmitting transmission data,
the first method being such that the plurality of subcarriers are non-continuously arranged the plurality of subcarriers in at least a first cluster and a second cluster where the first cluster includes a first portion of the plurality of subcarriers continuously allocated to form the first cluster and where the second cluster includes a second portion of the plurality of subcarriers continuously allocated to form the second cluster, and the second method being such that the plurality of subcarriers are arranged continuously to form a single cluster of subcarriers and a second information indicating a modulation scheme, a coding rate, the number of assigned subcarriers and a transmission power for transmitting the transmission data; and transmitting transmission data based on the first and second information received.

* * * * *